(12) United States Patent
Yoshikawa

(10) Patent No.: US 11,783,709 B2
(45) Date of Patent: Oct. 10, 2023

(54) TRAFFIC COMMUNICATION SYSTEM, ROADSIDE DEVICE, SERVER, AND TRAFFIC COMMUNICATION METHOD

(71) Applicant: KYOCERA Corporation, Kyoto (JP)

(72) Inventor: Takatoshi Yoshikawa, Hirakata (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/716,325

(22) Filed: Apr. 8, 2022

(65) Prior Publication Data
US 2022/0230545 A1 Jul. 21, 2022

Related U.S. Application Data

(63) Continuation of application No. PCT/JP2020/037954, filed on Oct. 7, 2020.

(30) Foreign Application Priority Data

Oct. 11, 2019 (JP) .................................. 2019-187774

(51) Int. Cl.
| | |
|---|---|
| *G08G 1/16* | (2006.01) |
| *H04W 4/44* | (2018.01) |
| *G08G 1/052* | (2006.01) |
| *G08G 1/09* | (2006.01) |

(52) U.S. Cl.
CPC ............... *G08G 1/16* (2013.01); *G08G 1/052* (2013.01); *G08G 1/09* (2013.01); *H04W 4/44* (2018.02)

(58) Field of Classification Search
CPC ............ G08G 1/16; G08G 1/052; G08G 1/09; H04W 4/44
See application file for complete search history.

(56) References Cited

U.S. PATENT DOCUMENTS 10,466,717 B1 * 11/2019 Su ......................... G06N 3/045

FOREIGN PATENT DOCUMENTS

| JP | 2001-184594 A | | 7/2001 |
|---|---|---|---|
| JP | 2008065516 | * | 9/2006 |
| JP | 5018613 | * | 4/2008 |
| JP | 2014-016883 A | | 1/2014 |
| WO | 2014/155884 A1 | | 10/2014 |

OTHER PUBLICATIONS

700 MHz Band Intelligent Transport Systems, ARIB STD-T109 Version 1.3, Association of Radio Industries and Businesses, Jul. 27, 2017, pp. 1-245.

* cited by examiner

*Primary Examiner* — Hongmin Fan
(74) *Attorney, Agent, or Firm* — Studebaker & Brackett PC

(57) ABSTRACT

A roadside device transmits, to a server, detection information indicating a detection result from a roadside sensor. In a case that a vehicle moving on a road toward the roadside device reaches a notification start point and that the vehicle is in a first geographic range, the server transmits the detection information received from the roadside device to the vehicle via the communication network. In a case that the vehicle moves from the first geographic range to a second geographic range located closer to the roadside device than the first geographic range, the roadside device transmits the detection information to the vehicle by the wireless communication.

13 Claims, 9 Drawing Sheets

TRAFFIC COMMUNICATION SYSTEM, ROADSIDE DEVICE, SERVER, AND TRAFFIC COMMUNICATION METHOD

RELATED APPLICATIONS

The present application is a continuation based on PCT Application No. PCT/JP2020/037954, filed on Oct. 7, 2020, which claims the benefit of Japanese Patent Application No. 2019-187774, filed on Oct. 11, 2019. The content of which is incorporated by reference herein in their entirety.

TECHNICAL FIELD

The present disclosure relates to a traffic communication system, a roadside device, a server, and a traffic communication method.

BACKGROUND ART

In recent years, Intelligent Transport Systems (ITSs) have attracted attention as technology for enabling avoidance of insecurity of traffic accidents.

As one such system, Non-Patent Literature 1 describes a system including a roadside device corresponding to a base station installed on a roadside, and an in-vehicle device corresponding to a mobile station installed in a vehicle, the roadside device and the in-vehicle device performing wireless communication. This wireless communication may be referred to as a roadside-to-vehicle communication.

CITATION LIST

Non-Patent Literature

Non-Patent Literature 1: ARIB STD-T109 1.3 version "700 MHz Band Intelligent Transport System"

SUMMARY OF INVENTION

A traffic communication system according to a first aspect includes a roadside sensor configured to detect an obstacle on a road, a roadside device configured to perform wireless communication with a vehicle on the road, and a server configured to communicate with the vehicle and the roadside device via a communication network. The roadside device is configured to transmit, to the server, detection information indicating a detection result from the roadside sensor. The server is configured to transmit the detection information received from the roadside device to the vehicle via the communication network in a case that the vehicle moving on the road toward the roadside device reaches a notification start point and that the vehicle is in a first geographic range. The roadside device is configured to transmit the detection information to the vehicle by the wireless communication in a case that the vehicle moves from the first geographic range to a second geographic range located closer to the roadside device than the first geographic range.

A roadside device according to a second aspect is a roadside device used in a traffic communication system, the roadside device including a first communicator configured to perform wireless communication with a vehicle on a road, a second communicator configured to transmit detection information indicating a detection result from a roadside sensor for detecting an obstacle on the road, via a communication network, to a server communicating with the vehicle and the roadside device, and a controller. The controller is configured to not transmit the detection information to the vehicle by the wireless communication in a case that the vehicle moving on the road toward the roadside device reaches a notification start point and that the vehicle is in a first geographic range, and transmit the detection information to the vehicle by the wireless communication in a case that the vehicle moves from the first geographic range to a second geographic range located closer to the roadside device than the first geographic range.

A roadside device according to a third aspect is configured to not transmit, to a vehicle by wireless communication with the vehicle, detection information indicating a detection result from a roadside sensor for detecting an obstacle on a road in a case that a distance between the roadside device and the vehicle is a first distance, and transmit the detection information to the vehicle by the wireless communication in a case that the distance between the roadside device and the vehicle is a second distance shorter than the first distance.

A server according to a fourth aspect is a server used in a traffic communication system, the server including a communicator configured to communicate with a vehicle and a roadside device via a communication network, the communicator being configured to receive, from the roadside device, detection information indicating a detection result from a roadside sensor for detecting an obstacle on a road, and a controller configured to transmit the detection information received from the roadside device to the vehicle via the communication network in a case that the vehicle moving on the road toward the roadside device reaches a notification start point and that the vehicle is in a first geographic range.

A traffic communication method according to a fifth aspect includes detecting, by a roadside sensor, an obstacle on a road, transmitting, by a roadside device configured to perform wireless communication with a vehicle on the road, detection information indicating a detection result from the roadside sensor, via a communication network, to a server communicating with the vehicle and the roadside device, transmitting, by the server, the detection information received from the roadside device to the vehicle via the communication network in a case that the vehicle moving on the road toward the roadside device reaches a notification start point and that the vehicle is in a first geographic range, and transmitting, by the roadside device, the detection information to the vehicle by the wireless communication in a case that the vehicle moves from the first geographic range to a second geographic range located closer to the roadside device than the first geographic range.

DESCRIPTION OF EMBODIMENTS

On a road, an obstacle may be present that prevents passage of vehicles. A technology is available in which such an obstacle is detected by a vehicle-side sensor. However, disadvantageously, depending on road environments, the obstacle cannot be detected by the vehicle-side sensor alone, and thus occurrence of traffic accidents cannot be sufficiently suppressed.

Thus, the present disclosure enables occurrence of traffic accidents to be suppressed.

A traffic communication system according to an embodiment will be described with reference to the drawings. Note that in the following description of the drawings, the same or similar components will be denoted by the same or similar reference signs.

Configuration of Traffic Communication System

Figure 1:
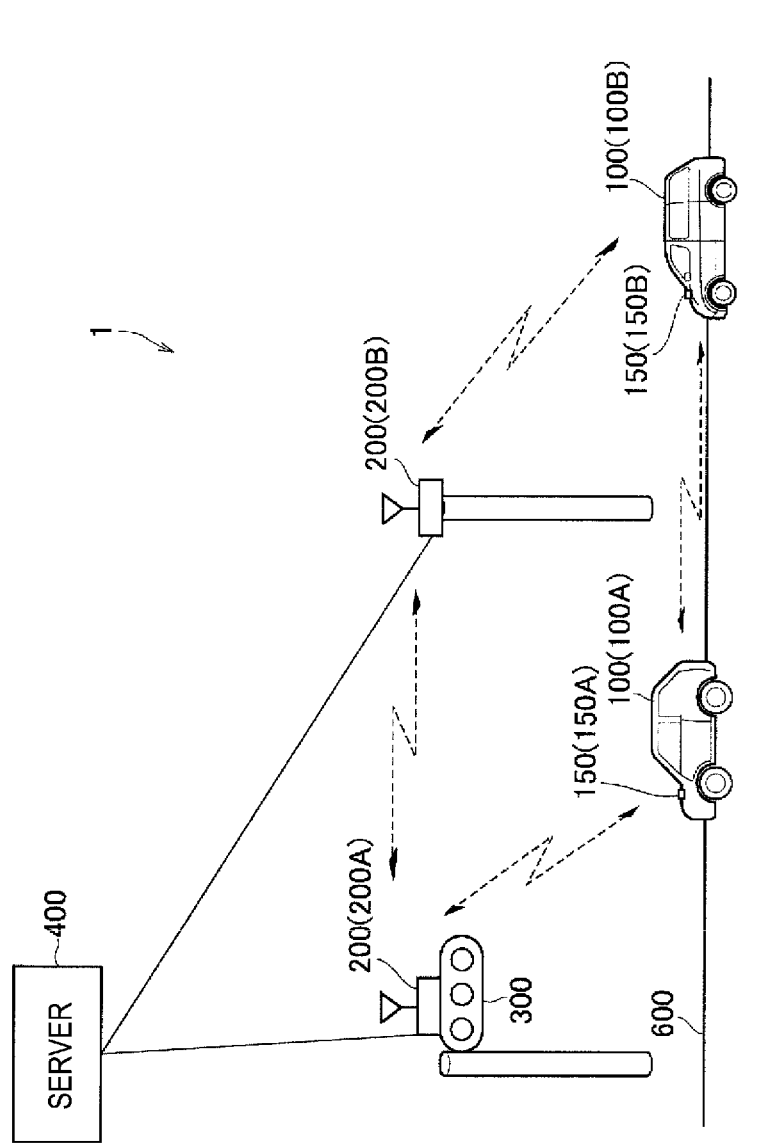
FIG. 1 is a diagram illustrating a configuration of a traffic communication system according to an embodiment.

First, a configuration of a traffic communication system according to an embodiment will be described. FIG. 1 is a diagram illustrating a configuration of a traffic communication system 1 according to an embodiment.

As illustrated in FIG. 1, the traffic communication system 1 includes vehicles 100 passing through a road 600, and roadside devices 200 corresponding to base stations installed on the roadside of the road 600.

FIG. 1 illustrates vehicles 100A and 100B as the vehicles 100, and illustrates roadside devices 200A and 200B as the roadside devices 200. Note that as the vehicles 100, automobiles such as ordinary motor vehicles or light motor vehicles are illustrated but that the vehicles 100 may be any vehicles passing through the road 600 and may be, for example, motorcycles or the like. The vehicle 100 may be a self-driving vehicle.

Each vehicle 100 is equipped with an in-vehicle device 150 corresponding to a mobile station for performing wireless communication. The in-vehicle device 150 performs roadside-to-vehicle communication with the roadside device 200. In FIG. 1, an example is illustrated in which an in-vehicle device 150A and the roadside device 200A perform roadside-to-vehicle communication, and an in-vehicle device 150B and the roadside device 200B perform roadside-to-vehicle communication.

Each of the roadside devices 200 may perform inter-roadside communication with the other roadside devices 200. In FIG. 1, an example is illustrated in which roadside device 200A and roadside device 200B perform inter-roadside communication via wireless communication, but the inter-roadside communication may be wired communication.

In the example illustrated in FIG. 1, the roadside device 200A is installed on a traffic light (traffic signal light) 300 or a support of the traffic light 300 and operates in conjunction with the traffic light 300. For example, the roadside device 200A transmits, to the vehicle 100 (in-vehicle device 150), a radio signal including signal information related to the traffic light 300. For such roadside-to-vehicle communication, broadcast wireless communication for a large number of unspecified destinations may be used. Alternatively, for the roadside-to-vehicle communication, multicast wireless communication for a large number of specified destinations may be used, or unicast wireless communication for a single specified destination may be used.

Each roadside device 200 is connected to a server 400 via a communication line. The communication line may be a wired line or a wireless line. An example will be mainly described below in which the communication line between each of the roadside devices 200 and the server 400 is a wireless line, for example, a cellular communication line. The server 400 manages various types of traffic information.

Configuration of Roadside Device

Figure 2:
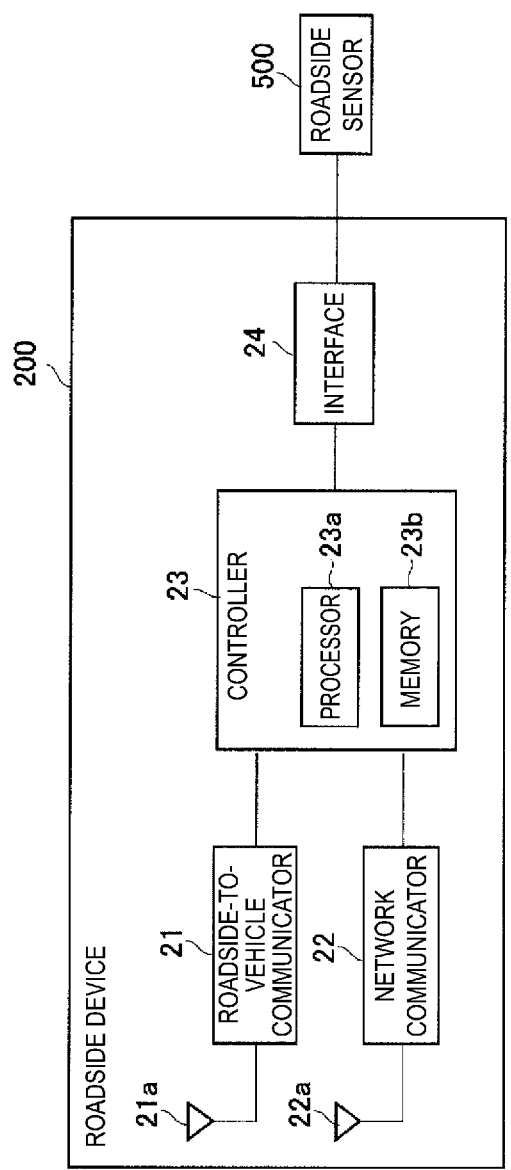
FIG. 2 is a diagram illustrating a configuration of a roadside device according to an embodiment.

Now, a configuration of the roadside device 200 according to an embodiment will be described. FIG. 2 is a diagram illustrating the configuration of the roadside device 200 according to an embodiment.

As illustrated in FIG. 2, the roadside device 200 according to an embodiment includes a roadside-to-vehicle communicator 21, a network communicator 22, a controller 23, and an interface 24.

The roadside-to-vehicle communicator 21 performs wireless communication (that is, roadside-to-vehicle communication) with an in-vehicle device 150. In other words, the roadside-to-vehicle communicator 21 corresponds to a first communicator that performs wireless communication with the vehicle 100.

Specifically, the roadside-to-vehicle communicator 21 includes an antenna 21a, and performs roadside-to-vehicle communication via the antenna 21a. The antenna 21a may be a non-directional antenna, or may be a directional antenna having directivity. The roadside-to-vehicle communicator 21 converts a radio signal received by the antenna 21a into receive data and outputs the receive data to the controller 23. Additionally, the roadside-to-vehicle communicator 21 converts transmit data output by the controller 23 into a radio signal and transmits the radio signal from the antenna 21a.

The wireless communication scheme of the roadside-to-vehicle communicator 21 may be a scheme compliant with the T109 standard of Association of Radio Industries and Businesses (ARIB), a scheme compliant with the Vehicle-to-everything (V2X) standard of Third Generation Partnership Project (3GPP), and/or a scheme compliant with the wireless Local Area Network (LAN) standard such as the Institute of Electrical and Electronics Engineers (IEEE) 802.11 series. The roadside-to-vehicle communicator 21 may be configured to be capable of conforming to all of these communication standards.

The network communicator 22 communicates with a communication network 700 (not illustrated in FIG. 2. See FIG. 5) (i.e., performs network communications). In other words, the network communicator 22 corresponds to a second communicator configured to perform network communications. An example will be described below in which the network communicator 22 performs cellular communication with a base station 701 of the communication network 700, but the network communicator 22 may perform wired communication with the communication network 700.

The network communicator 22 includes an antenna 22a, and performs cellular communication via the antenna 22a. The network communicator 22 converts a radio signal received by the antenna 22a into receive data and outputs the receive data to the controller 23. Additionally, the network communicator 22 converts transmit data output by the controller 23 into a radio signal and transmits the radio signal from the antenna 22a.

The wireless communication scheme of the network communicator 22 may be a scheme compliant with the 3GPP standard, for example, a scheme compliant with Long Term Evolution (LTE), corresponding to a fourth generation cellular communication standard, and/or a scheme compliant with New Radio (NR), corresponding to a fifth generation cellular communication standard. In a case that the wireless communication scheme of the roadside-to-vehicle communicator 21 is a scheme compliant with the V2X standard of the 3GPP, the roadside-to-vehicle communicator 21 and the network communicator 22 may be integrally configured.

The controller 23 controls various functions of the roadside device 200. The controller 23 includes at least one memory 23$b$ and at least one processor 23$a$ electrically connected to the memory 23$b$. The memory 23$b$ includes a volatile memory and a non-volatile memory and stores information used for processing in the processor 23$a$ and programs executed by the processor 23$a$. The memory 23$b$ corresponds to a storage. The processor 23$a$ executes programs stored in the memory 23$b$ to perform various processing.

The interface 24 is connected to a roadside sensor 500 via a wired line and/or a wireless line. The roadside sensor 500 may be any sensor capable of detecting an obstacle on the road 600, but may be further connected to an image sensor (camera), millimeter wave sensor, ultrasonic sensor, and infrared sensor. The interface 24 outputs a detection result of the roadside sensor 500 to the controller 23. The roadside sensor 500 may be integrated with the roadside device 200.

Note that the interface 24 may be connected to the server 400 in a wired or wireless manner. The interface 24 may be connected to the traffic light 300 in a wired or wireless manner.

Configuration of Vehicle

Figure 3:
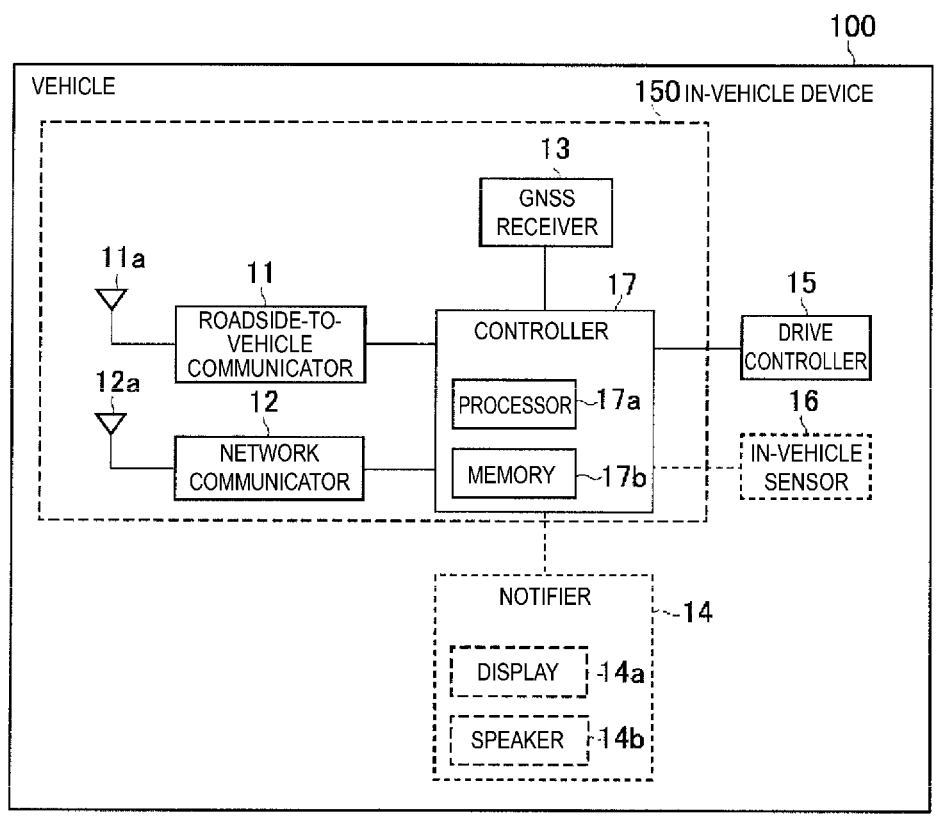
FIG. 3 is a diagram illustrating a configuration of a vehicle according to an embodiment.

Now, a configuration of the vehicle 100 according to an embodiment will be described. FIG. 3 is a diagram illustrating a configuration of the vehicle 100 according to an embodiment.

As illustrated in FIG. 3, the vehicle 100 according to an embodiment includes a roadside-to-vehicle communicator 11, a network communicator 12, a GNSS receiver 13, a notifier 14, a drive controller 15, an in-vehicle sensor 16, and a controller 17. Note that, the vehicle 100 need not include the in-vehicle sensor 16. The roadside-to-vehicle communicator 11, the network communicator 12, the GNSS receiver 13, and the controller 17 constitute the in-vehicle device 150.

The roadside-to-vehicle communicator 11 performs roadside-to-vehicle communication with the roadside device 200. In other words, the roadside-to-vehicle communicator 11 corresponds to a first communicator that performs wireless communication with the roadside device 200.

Specifically, the roadside-to-vehicle communicator 11 includes an antenna 11$a$, and performs roadside-to-vehicle communication via the antenna 11$a$. The roadside-to-vehicle communicator 11 converts a radio signal received by the antenna 11$a$ into receive data and outputs the receive data to the controller 17. The roadside-to-vehicle communicator 11 converts the transmit data output by the controller 17 into a radio signal and transmits the radio signal from the antenna 11$a$.

The wireless communication scheme of the roadside-to-vehicle communicator 11 may be a scheme compliant with the T109 standard of ARIB, a scheme compliant with the V2X standard of the 3GPP, and/or a scheme compliant with the wireless LAN standard such as the IEEE 802.11 series. The roadside-to-vehicle communicator 11 may be configured to be capable of conforming to all of these communication standards.

The network communicator 12 communicates with the communication network 700. In an embodiment, the network communicator 12 performs cellular communication with the base station 701 of the communication network 700. The network communicator 12 includes an antenna 12$a$, and performs cellular communication via the antenna 12$a$. The network communicator 12 converts a radio signal received by the antenna 12$a$ into receive data and outputs the receive data to the controller 17. Additionally, the network communicator 12 converts the transmit data output by the controller 17 into a radio signal and transmits the radio signal from the antenna 12$a$.

The wireless communication scheme of the network communicator 12 may be a scheme compliant with the 3GPP standard, for example, a scheme compliant with LTE, corresponding to a fourth generation cellular communication standard, and/or a scheme compliant with NR, corresponding to a fifth generation cellular communication standard. In a case that the wireless communication scheme of the roadside-to-vehicle communicator 11 is a scheme compliant with the V2X standard of the 3GPP, the roadside-to-vehicle communicator 11 and the network communicator 12 may be integrally configured.

The GNSS receiver 13 receives a GNSS signal from a Global Navigation Satellite System (GNSS) satellite, and outputs positional information indicating the current position. The positional information includes latitude and longitude. The GNSS receiver 13 may include at least one GNSS receiver included in a GPS receiver, a Global Navigation Satellite System (GLONASS) receiver, an Indian Regional Navigational Satellite System (IRNSS) receiver, a COMPASS receiver, a Galileo receiver, and a Quasi-Zenith Satellite System (QZSS) receiver, for example.

Under the control of the controller 17, the notifier 14 notifies information to a driver of the vehicle 100. The notifier 14 includes a display 14$a$ that displays information, and a speaker 14$b$ that audibly outputs information.

The drive controller 15 controls an engine or a motor as a source of power, a power transmission mechanism, brakes, and the like. In a case where the vehicle 100 is a self-driving vehicle, the drive controller 15 may perform self-driving control of the vehicle 100 in cooperation with the controller 17.

The in-vehicle sensor 16 may be any sensor capable of detecting an obstacle on the road 600 ahead in a travel direction of the vehicle 100, but includes at least one of an image sensor (camera), a millimeter wave sensor, an ultrasonic sensor, and an infrared sensor, for example. A detection result of the in-vehicle sensor 16 may be used for self-driving control of the vehicle 100.

The controller 17 controls various functions of the vehicle 100 (in-vehicle device 150). The controller 17 includes at least one memory 17$b$ and at least one processor 17$a$ electrically connected to the memory 17$b$. The memory 17$b$ includes a volatile memory and a non-volatile memory and stores information used for processing in the processor 17$a$ and programs executed by the processor 17$a$. The processor 17$a$ executes programs stored in the memory 17$b$ to perform various processing.

Configuration of Server

Figure 4:
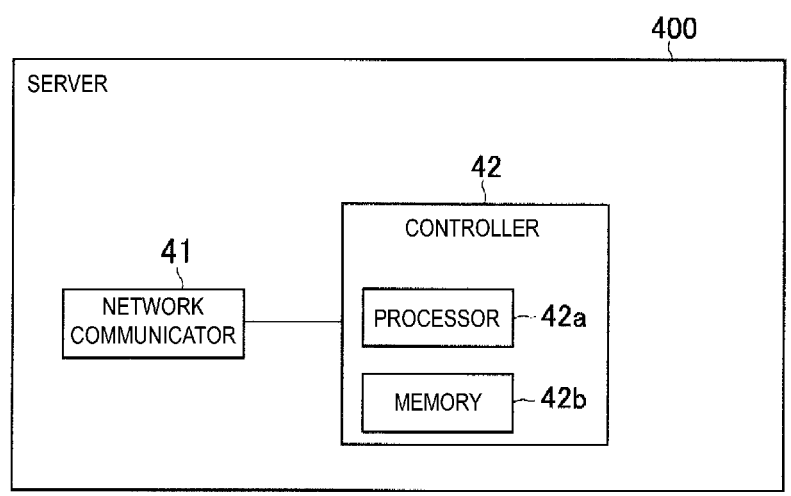
FIG. 4 is a diagram illustrating a configuration of a server according to an embodiment.

Now, a configuration of the server 400 according to an embodiment will be described. FIG. 4 illustrates the configuration of the server 400 according to an embodiment.

As illustrated in FIG. 4, the server 400 according to an embodiment includes a network communicator 41 and a controller 42.

The network communicator 41 communicates via the communication network 700. In an embodiment, the network communicator 41 communicates with the vehicle 100 and the roadside device 200 via the communication network 700.

The controller 42 controls various functions of the server 400. The controller 42 includes at least one memory 42b and at least one processor 42a electrically connected to the memory 42b. The memory 42b includes a volatile memory and a non-volatile memory and stores information used for processing in the processor 42a and programs executed by the processor 42a. The memory 42b corresponds to a storage. The processor 42a executes programs stored in the memory 42b to perform various processing.

Operations of Traffic Communication System

Figure 5:
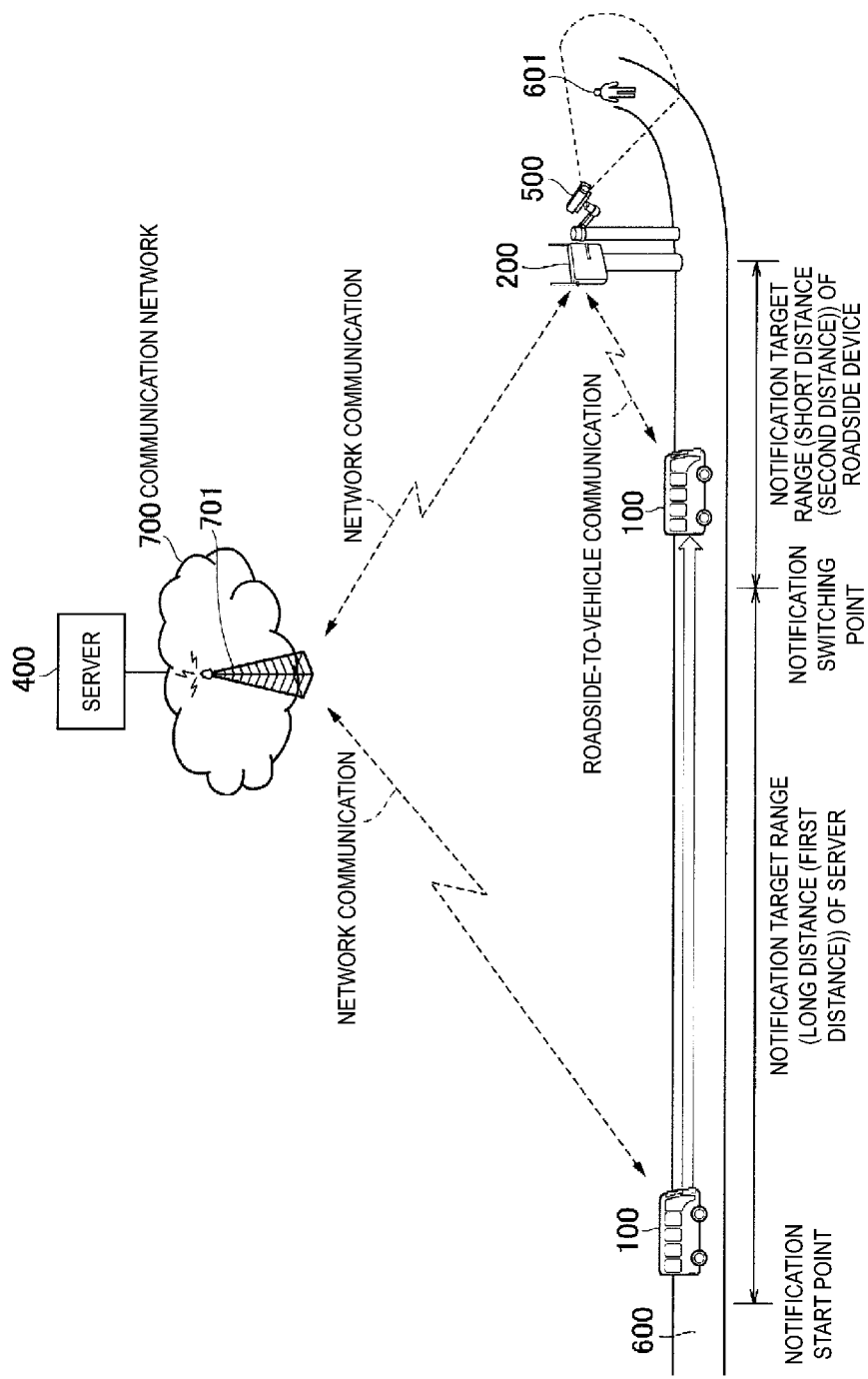
FIG. 5 is a diagram illustrating an example of an operational environment of the traffic communication system according to an embodiment.

Now, operations of the traffic communication system 1 according to an embodiment will be described. FIG. 5 is a diagram illustrating an example of operational environments of the traffic communication system 1 according to an embodiment.

As illustrated in FIG. 5, the vehicle 100 travels on the road 600. In the example illustrated in FIG. 5, the vehicle 100 is a self-driving vehicle, specifically a self-driving bus. The vehicle 100 performs self-driving (autonomous traveling) using the in-vehicle sensor 16 of the subject vehicle. The road 600 may be an exclusive bus road used by self-driving buses.

Also, the vehicle 100 utilizes information from traffic infrastructures for self-driving. In the example illustrated in FIG. 5, the road 600 includes a left-hand curve as viewed from the vehicle 100. It is difficult for the in-vehicle sensor 16 of the vehicle 100 to detect the condition beyond such a curve.

An obstacle 601 may be present on the road 600 beyond the curve. The obstacle 601 refers to an object that prevents passage of a vehicle, and the type of obstacle 601 is, for example, a pedestrian, a fallen object, a disabled vehicle, a road damage (for example, a hole), or the like.

In response to detecting the obstacle 601 on the road 600 ahead in the travel direction, the vehicle 100 decelerates to avoid a collision with the obstacle 601 and stops in front of the obstacle 601. For such an operation, in a case that the vehicle 100 is driven, for example, at a speed of 60 km/h, the obstacle 601 located 100 m ahead needs to be detected. However, it is difficult for the vehicle 100 to detect the condition beyond the curve by using the in-vehicle sensor 16.

In an embodiment, to notify vehicle 100 of the condition beyond the curve, the roadside device 200 connected to the roadside sensor 500 is installed short of the curve. The roadside device 200 transmits, to the vehicle 100 by roadside-to-vehicle communication, detection information indicating a detection result from the roadside sensor 500. Thus, the vehicle 100 can detect the obstacle 601, that is difficult to detect by the in-vehicle sensor 16, with the assistance of the roadside device 200.

The detection information may include any information indicating the detection result from roadside sensor 500, but includes at least one of information indicating the presence or absence of obstacle 601, information indicating the position of the obstacle 601, information indicating the movement speed of the obstacle 601, information indicating the movement direction of the obstacle 601, and information indicating the type of the obstacle 601, for example.

The roadside-to-vehicle communication involves only a short delay from the detection of the obstacle 601 by the roadside device 200 until the reception of detection information by the vehicle 100, but has the disadvantage of providing only a narrow communicable range. Thus, it is difficult to transmit the detection information to the vehicle 100 located far from the roadside device 200.

For compensation for such a disadvantage, the detection information is enabled to be transmitted from the server 400 to the vehicle 100 via the communication network 700. By utilizing such network communication, the detection information can be transmitted to the vehicle 100 located far from the roadside device 200. However, compared to roadside-to-vehicle communication, network communication involves a longer delay from the detection of the obstacle 601 by the roadside device 200 until the reception of the detection information by the vehicle 100.

An operation of notifying the vehicle 100 of the detection information by network communication and an operation of notifying the vehicle 100 of the detection information via roadside-to-vehicle communication may be constantly performed, but the constant performance of the operations poses a problem in terms of effective use of the processing resources and the radio resources.

Thus, in an embodiment, depending on the distance between the vehicle 100 and the roadside device 200, switching is performed between the operation of notifying the vehicle 100 of the detection information via network communication and the operation of notifying the vehicle 100 of the detection information by the roadside-to-vehicle communication. In other words, the network communication and the roadside-to-vehicle communication are selectively used to notify the vehicle 100 of the detection information.

Specifically, the traffic communication system 1 according to an embodiment includes the roadside sensor 500 for detecting the obstacle 601 on the road 600, the roadside device 200 that performs wireless communication with the vehicle 100 on the road 600, and the server 400 that communicates with the vehicle 100 and the roadside device 200 via the communication network 700. The roadside device 200 transmits, to server 400, the detection information indicating the detection result from roadside sensor 500. In a case that the distance between the vehicle 100 and the roadside device 200 is a first distance, the server 400 transmits the detection information received from the roadside device 200 to the vehicle 100 via the communication network 700. In a case that the distance between the vehicle 100 and the roadside device 200 is a second distance that is shorter than the first distance, the roadside device 200 transmits the detection information to the vehicle 100 by wireless communication (roadside-to-vehicle communication).

In this regard, the first distance may be a distance that disables wireless communication with the roadside device 200, and the second distance may be a distance that enables wireless communication with the roadside device 200 (e.g., the reach of radio waves from the roadside device 200). Hereinafter, for convenience of description, the first distance is referred to as the "long distance", and the second distance is referred to as "short distance".

According to an embodiment, by switching between the operation of notifying the vehicle 100 of the detection information by the network communication and the operation of notifying the vehicle 100 of the detection information by the roadside-to-vehicle communication, the occurrence of traffic accidents can be suppressed with the processing resources and the radio resources effectively utilized.

Note that when the vehicle 100 arrives at a notification start point on the road 600, the server 400 initiates the operation of notifying the vehicle 100 of the detection information by the network communication. The server 400 may determine the movement speed of the vehicle 100 and adjust the position of the notification start point based on the movement speed determined. For example, in a case that the movement speed of the vehicle 100 is higher than a reference speed, the server 400 configures the notification start point located short of the reference point (i.e., a side farther from the roadside device 200). On the other hand, in a case that the movement speed of the vehicle 100 is lower than the reference speed, the server 400 configures the notification start point located beyond the reference point (i.e., a side closer to roadside device 200).

Thus, in the traffic communication system 1 according to an embodiment, in a case that the vehicle 100 moving on the road 600 toward the roadside device 200 reaches the notification start point, and that the vehicle 100 is in a first geographic range (a notification target range of the server 400), the server 400 transmits the detection information received from the roadside device 200 to the vehicle 100 via the communication network 700.

On the other hand, in a case that the vehicle 100 moves from the first geographic range to a second geographic range (a notification target range of the roadside device 200) located further on the roadside device 200 side than the first geographic range, the roadside device 200 transmits the detection information to the vehicle 100 by the wireless communication. In this regard, the second geographic range may be a communicable range enabling wireless communication with the roadside device.

Note that when the vehicle 100 is in the second geographic range (the notification target range of the roadside device 200), the server 400 does not transmit the detection information from the server 400 to the vehicle 100. Additionally, when the vehicle 100 is in the first geographic range (the notification target range of the server 400), the roadside device 200 does not transmit the detection information from the roadside device 200 to the vehicle 100. This allows the detection information to be notified to the roadside device 200 while saving the radio resources.

Note that the server 400 may be an edge server in edge computing. The edge server is deployed, for example, in association with an area corresponding to each of predefined zones, and configured to manage the geographic range described above. One or a plurality of geographic ranges may be present within the area.

Hereinafter, the first distance (long distance) described above may be interpreted as the first geographic range (the notification target range of the server 400). The second distance (short distance) described above may be interpreted as the second geographic range (the notification target range of the roadside device 200).

As an example, when the roadside device 200A detects the obstacle 601, the roadside device 200A transmits the detection information of the roadside device 200A to the vehicle 100 present in the first geographic range corresponding to roadside device 200A (here, referred to as the first geographic range A). Additionally, when the roadside device 200B detects the obstacle 601, the roadside device 200B transmits the detection information of the roadside device 200B to the vehicle 100 present in the first geographic range corresponding to roadside device 200B (here, referred to as first geographic range B). The first geographic range A and the first geographic range B may be managed by a single server 400.

As another example, when roadside device 200A detects the obstacle 601, the roadside device 200A transmits the detection information of the roadside device 200A to the vehicle 100 present in the first geographic range corresponding to roadside device 200A (here, referred to as the first geographic range C). Additionally, when the roadside device 200B detects the obstacle 601, the roadside device 200B transmits the detection information of the roadside device 200B to the vehicle 100 present in the first geographic range corresponding to roadside device 200B (here, referred to as the same first geographic range C). The first geographic range C may be managed by the server 400.

(1) Operation Example 1

Now, Operation Example 1 of the traffic communication system 1 according to an embodiment will be described. In Operation Example 1, it is assumed that the vehicle 100 periodically notifies the server 400 of the positional information from the network communicator 12 and that the vehicle 100 periodically transmits (e.g., broadcasts) vehicle related information from the roadside-to-vehicle communicator 11.

Figure 6:
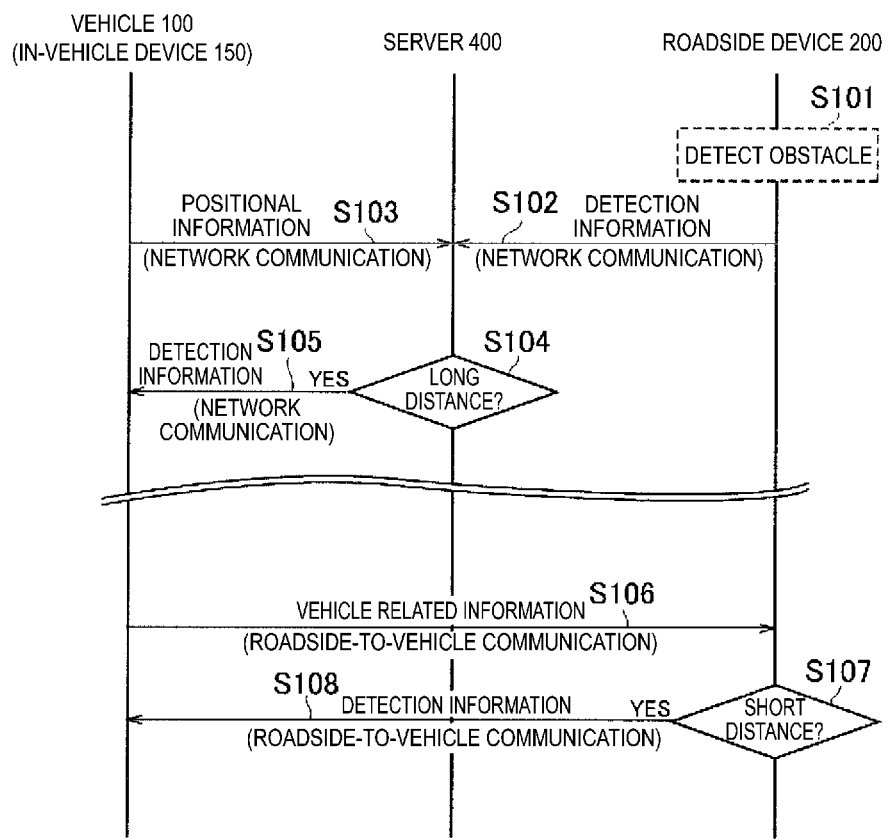
FIG. 6 is a diagram illustrating Operation Example 1 of the traffic communication system according to an embodiment.

FIG. 6 is a diagram illustrating Operation Example 1 of the traffic communication system 1 according to an embodiment.

As illustrated in FIG. 6, in step S101, the controller 23 of the roadside device 200 detects the obstacle 601 based on the detection result from the roadside sensor 500. The controller 23 of the roadside device 200 may generate the detection information only during the period in which the obstacle 601 is detected, or may generate the detection information regardless of whether the obstacle 601 is detected.

In step S102, the controller 23 of the roadside device 200 controls the network communicator 22 to transmit the detection information to the server 400. The controller 23 of the roadside device 200 may periodically notify the server 400 of the detection information. The network communicator 41 of the server 400 receives the detection information from the roadside device 200.

In step S103, the controller 17 of the vehicle 100 generates positional information by using the GNSS receiver 13, and controls the network communicator 12 to transmit the positional information to the server 400. The controller 17 of the vehicle 100 may periodically notify the server 400 of the latest positional information. The network communicator 41 of the server 400 receives the positional information from the vehicle 100.

In step S104, the controller 42 of the server 400 determines the distance between the vehicle 100 and the roadside device 200 based on the positional information from the vehicle 100. The controller 42 of the server 400 stores the installation position of the roadside device 200 in advance, and can calculate the distance from the current position of the vehicle 100 and the installation position of the roadside device 200. The detection information received in step S102 may include the installation position of roadside device 200, and the controller 42 of server 400 may use the installation position to calculate the distance from the current position of vehicle 100 and the installation position of roadside device 200. Then, the controller 42 of the server 400 determines whether the vehicle 100 is in the notification target range (long distance) of the server 400 based on the determined distance.

The distance may be calculated from the current position of the vehicle 100 and the installation position of the roadside sensor 500, or may be calculated from the current position of the vehicle 100 and the position of the obstacle 601.

The network communicator 41 of the server 400 may receive the detection information including the detection result from the roadside sensor 500 and the installation position of the roadside sensor 500, by using any means (for example, input from a traffic center) including but not limited to the roadside device 200. The controller 42 of the server 400 may calculate the distance from the current position of the vehicle 100 and the installation position of the roadside sensor 500.

In step S105, in a case that the controller 42 of the server 400 determines that the vehicle 100 is in the notification target range (long distance) of the server 400, the controller 42 controls the network communicator 41 to transmit the detection information received from the roadside device 200 to the vehicle 100 via the communication network 700.

The network communicator 12 of the vehicle 100 receives the detection information from the server 400. The controller 17 of the vehicle 100 may perform self-driving control by using the detection information from the server 400 instead of the detection result from the in-vehicle sensor 16. The controller 17 of the vehicle 100 may use the detection information from the server 400 in combination with the detection result from the in-vehicle sensor 16 to perform self-driving control.

Subsequently, in step S106, the controller 17 of the vehicle 100 controls the roadside-to-vehicle communicator 11 to transmit vehicle related information.

The vehicle related information may be any information as long as the information is related to the vehicle 100, but includes at least one of information indicating the position of the vehicle 100, information indicating the movement speed of the vehicle 100, information indicating the movement direction of the vehicle 100, and information indicating the type of the vehicle 100, for example.

The roadside-to-vehicle communicator 21 of the roadside device 200 receives vehicle related information from the vehicle 100. In a case that the roadside-to-vehicle communicator 21 receives vehicle related information from the vehicle 100, the controller 23 of the roadside device 200 determines that the vehicle 100 is in the notification target range (short distance) of the roadside device 200 (step S107).

In step S108, in a case that it is determined that the vehicle 100 is in the notification target range (short distance) of the roadside device 200, the controller 23 of the roadside device 200 controls the roadside-to-vehicle communicator 11 to transmit the detection information to the vehicle 100. This transmission is performed by broadcast, multicast, or unicast.

The roadside-to-vehicle communicator 11 of the vehicle 100 receives the detection information from the roadside device 200. The controller 17 of the vehicle 100 may perform self-driving control using the detection information from the roadside device 200 in place of the detection result from the in-vehicle sensor 16. The controller 17 of the vehicle 100 may use the detection information from the roadside device 200 in combination with the detection result from the in-vehicle sensor 16 to perform self-driving control.

(2) Operation Example 2

Now, Operation Example 2 of the traffic communication system 1 according to an embodiment will be described focusing on differences from Operation Example 1. In Operation Example 2, as is the case with Operation Example 1, it is assumed that the vehicle 100 periodically notifies the server 400 of the positional information from the network communicator 12. Note that, in Operation Example 2, the vehicle 100 need not periodically transmit the vehicle related information from the roadside-to-vehicle communicator 11.

Figure 7:
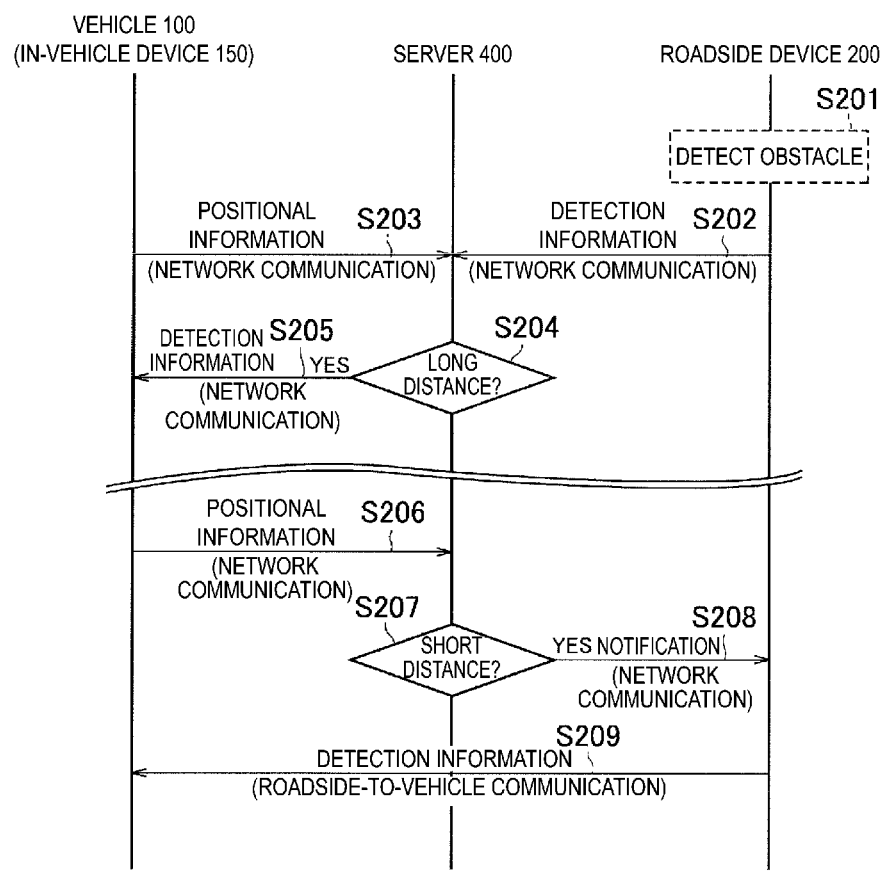
FIG. 7 is a diagram illustrating Operation Example 2 of the traffic communication system according to an embodiment.

FIG. 7 is a diagram illustrating Operation Example 2 of the traffic communication system 1 according to an embodiment.

As illustrated in FIG. 7, operations in steps S201 to S205 are similar to the operations in steps S101 to S105.

In step S206, the controller 17 of the vehicle 100 generates positional information by using the GNSS receiver 13, and controls the network communicator 12 to transmit the positional information to the server 400. The network communicator 41 of the server 400 receives the positional information from the vehicle 100.

In step S207, the controller 42 of the server 400 determines the distance between the vehicle 100 and the roadside device 200 based on the positional information from the vehicle 100. Then, the controller 42 of the server 400 determines whether the vehicle 100 is in the notification target range (long distance) of the server 400 or is in the notification target range (short distance) of the roadside device 200 based on the determined distance.

In step S208, in response to determining that the vehicle 100 is in the notification target range (short distance) of the roadside device 200, the controller 42 of the server 400 controls the network communicator 41 to transmit the corresponding notification to the roadside device 200 via the communication network 700. This notification can be considered as a request for transmission of the detection information. The network communicator 22 of the roadside device 200 receives the notification from the server 400.

In step S209, in response to receiving the notification from the server 400, the controller 23 of the roadside device 200 controls the roadside-to-vehicle communicator 11 to transmit the detection information to the vehicle 100. This transmission is performed by broadcast, multicast, or unicast.

The roadside-to-vehicle communicator 11 of the vehicle 100 receives the detection information from the roadside device 200. The controller 17 of the vehicle 100 may perform self-driving control using the detection information from the roadside device 200 in place of the detection result from the in-vehicle sensor 16. The controller 17 of the vehicle 100 may use the detection information from the roadside device 200 in combination with the detection result from the in-vehicle sensor 16 to perform self-driving control.

(3) Operation Example 3

Now, Operation Example 3 of the traffic communication system 1 according to an embodiment will be described focusing on differences from Operation Examples 1 and 2. In Operation Example 3, as is the case with Operation Example 1, it is assumed that the vehicle 100 periodically notifies the server 400 of the positional information from the network communicator 12, and that the vehicle 100 periodically transmits (e.g., broadcasts) the vehicle related information from the roadside-to-vehicle communicator 11.

Figure 8:
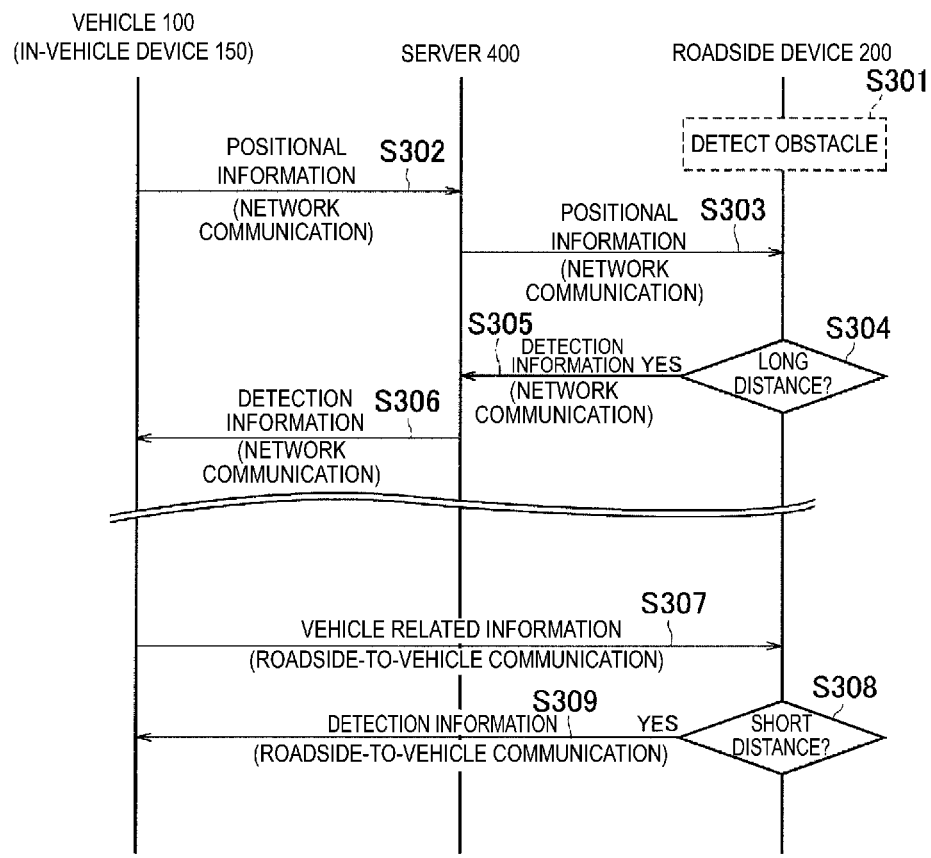
FIG. 8 is a diagram illustrating Operation Example 3 of the traffic communication system according to an embodiment.

FIG. 8 is a diagram illustrating Operation Example 3 of the traffic communication system 1 according to an embodiment.

As illustrated in FIG. 8, in step S301, the controller 23 of the roadside device 200 detects the obstacle 601 based on the detection result from the roadside sensor 500. The controller 23 of the roadside device 200 may generate the detection information only during the period in which the obstacle 601 is detected, or may generate the detection information regardless of whether the obstacle 601 is detected.

In step S302, the controller 17 of the vehicle 100 generates positional information by using the GNSS receiver 13, and controls the network communicator 12 to transmit the positional information to the server 400. The controller 17 of the vehicle 100 may periodically notify the server 400 of the latest positional information. The network communicator 41 of the server 400 receives the positional information from the vehicle 100.

In step S303, the controller 42 of the server 400 controls the network communicator 41 to transfer the positional information from the vehicle 100 to the roadside device 200. The network communicator 22 of the roadside device 200 receives the positional information from the server 400.

In step S304, the controller 23 of the roadside device 200 determines the distance between the vehicle 100 and the roadside device 200 based on the positional information from the server 400. The controller 23 of the roadside device 200 stores the installation position of the roadside device 200 in advance, and can calculate the distance from the current position of the vehicle 100 and the installation position of the roadside device 200. Then, based on the determined distance, the controller 23 of the roadside device 200 determines whether the vehicle 100 is in the notification target range (long distance) of the server 400 or is in the notification target range (short distance) of the roadside device 200.

In step S305, in response to determining that the vehicle 100 is in the notification target range (long distance) of the server 400, the controller 23 of the roadside device 200 controls the network communicator 22 to transmit the detection information to the server 400. The network communicator 41 of the server 400 receives the detection information.

In step S306, the controller 42 of the server 400 controls the network communicator 41 to transfer the detection information from the roadside device 200 to the vehicle 100. The network communicator 12 of the vehicle 100 receives the detection information from the server 400. The controller 17 of the vehicle 100 may perform self-driving control by using the detection information from the server 400 instead of the detection result from the in-vehicle sensor 16. The controller 17 of the vehicle 100 may use the detection information from the server 400 in combination with the detection result from the in-vehicle sensor 16 to perform self-driving control.

Operations in steps S307 to S309 are similar to the operations in steps S106 to S108 of Operation Example 1.

(4) Operation Example 4

Now, Operation Example 4 of the traffic communication system 1 according to an embodiment will be described focusing on differences from Operation Examples 1 to 3. In Operation Example 4, as is the case with Operation Example 2, it is assumed that the vehicle 100 periodically notifies the server 400 of the positional information from the network communicator 12 but that the vehicle 100 need not periodically transmit the vehicle related information from the roadside-to-vehicle communicator 11.

Figure 9:
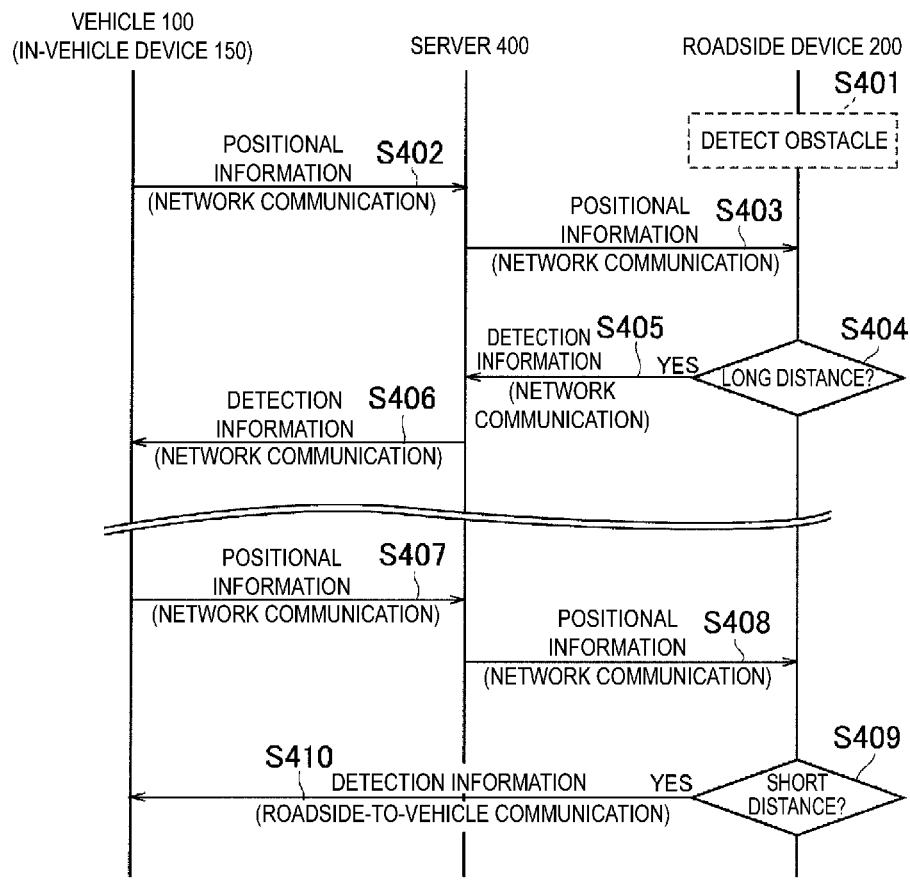
FIG. 9 is a diagram illustrating Operation Example 4 of the traffic communication system according to an embodiment.

FIG. 9 is a diagram illustrating Operation Example 4 of the traffic communication system 1 according to an embodiment.

As illustrated in FIG. 9, operations in steps S401 to S406 are similar to the operations in steps S301 to S306 of Operation Example 3.

In step S407, the controller 17 of the vehicle 100 generates positional information by using the GNSS receiver 13, and controls the network communicator 12 to transmit the positional information to the server 400. The controller 17 of the vehicle 100 may periodically notify the server 400 of the latest positional information. The network communicator 41 of the server 400 receives the positional information from the vehicle 100.

In step S408, the controller 42 of the server 400 controls the network communicator 41 to transfer the positional information from the vehicle 100 to the roadside device 200. The network communicator 22 of the roadside device 200 receives the positional information from the server 400.

In step S409, the controller 23 of the roadside device 200 determines the distance between the vehicle 100 and the roadside device 200 based on the positional information from the server 400. Then, based on the determined distance, the controller 23 of the roadside device 200 determines whether the vehicle 100 is in the notification target range (long distance) of the server 400 or is in the notification target range (short distance) of the roadside device 200.

In step S410, in a case that the controller 23 of the roadside device 200 determines that the vehicle 100 is in the notification target range (short distance) of the roadside device 200, the controller 23 of the roadside device 200 controls the roadside-to-vehicle communicator 11 to transmit the detection information to the vehicle 100. This transmission is performed by broadcast, multicast, or unicast.

The roadside-to-vehicle communicator 11 of the vehicle 100 receives the detection information from the roadside device 200. The controller 17 of the vehicle 100 may perform self-driving control using the detection information from the roadside device 200 in place of the detection result from the in-vehicle sensor 16. The controller 17 of the vehicle 100 may use the detection information from the roadside device 200 in combination with the detection result from the in-vehicle sensor 16 to perform self-driving control.

OTHER EMBODIMENTS

A program may be provided that causes a computer to execute each of the processing operations performed by the in-vehicle device 150, the roadside device 200, or the server 400. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Additionally, circuits for executing processing operations performed by the in-vehicle device 150, the roadside device 200, or the server 400 may be integrated to configure at least a portion of the in-vehicle device 150, the roadside device 200, or the server 400 as a semiconductor integrated circuit (chip set, SoC).

Embodiments have been described above in detail with reference to the drawings, but specific configurations are not limited to those described above, and various design modifications can be made without departing from the gist of the present disclosure.

The invention claimed is:

1. A traffic communication system comprising:
   a roadside sensor configured to detect an obstacle on a road;
   a roadside device configured to perform wireless communication with a vehicle on the road; and
   a server configured to communicate with the vehicle and the roadside device via a communication network, wherein
   the roadside device is configured to transmit, to the server, detection information indicating a detection result from the roadside sensor,
   the server is configured to transmit the detection information received from the roadside device to the vehicle via the communication network in a case that the vehicle moving on the road toward the roadside device reaches a notification start point and that the vehicle is in a first geographic range,
   the server is configured to not transmit the detection information to the vehicle via the communication network in a case that the vehicle moves from the first geographic range to a second geographic range located closer to the roadside device than the first geographic range,
   the roadside device is configured to transmit the detection information to the vehicle by the wireless communication in a case that the vehicle moves from the first geographic range to the second geographic range, and
   the roadside device is configured to not transmit the detection information to the vehicle by the wireless communication in a case that the vehicle moving on the road toward the roadside device reaches the notification start point and that the vehicle is in the first geographic range.

2. The traffic communication system according to claim 1, wherein
   the second geographic range is a communicable range enabling the wireless communication between the vehicle and the roadside device.

3. The traffic communication system according to claim 1, wherein
   the detection information includes at least one of information indicating presence or absence of the obstacle, information indicating a position of the obstacle, information indicating a movement speed of the obstacle, information indicating a movement direction of the obstacle, or information indicating a type of the obstacle.

4. The traffic communication system according to claim 3, wherein
   the roadside device is configured to
   receive, from the vehicle by the wireless communication, vehicle related information related to the vehicle, and
   transmit the detection information to the vehicle by the wireless communication in response to receiving the vehicle related information from the vehicle.

5. The traffic communication system according to claim 1, wherein
   the server is configured to
   receive, from the vehicle via the communication network, positional information indicating a position of the vehicle, and
   determine whether the vehicle is in the first geographic range based on the positional information.

6. The traffic communication system according to claim 5, wherein
   the server is configured to transmit a notification to the roadside device in response to determining the vehicle to be in the second geographic range, and
   the roadside device is configured to transmit the detection information to the vehicle by the wireless communication in response to receiving the notification from the server.

7. The traffic communication system according to claim 1, wherein
   the roadside device is configured to
   receive, from the server via the communication network, positional information indicating a position of the vehicle, and
   determine whether the vehicle is in the second geographic range based on the positional information.

8. The traffic communication system according to claim 7, wherein
   the roadside device is configured to transmit the detection information to the server in response to determining the vehicle to be in the first geographic range, and
   the server is configured to transmit, to the vehicle via the communication network, the detection information received from the roadside device.

9. The traffic communication system according to claim 7, wherein
   the roadside device is configured to transmit the detection information to the vehicle by the wireless communication in response to determining the vehicle to be in the second geographic range.

10. The traffic communication system according to claim 1, wherein
    the server is configured to
    determine the movement speed of the vehicle, and
    change the notification start point based on the movement speed of the vehicle.

11. A roadside device used in a traffic communication system, the roadside device comprising:
    a first communicator configured to perform wireless communication with a vehicle on a road;
    a second communicator configured to transmit detection information indicating a detection result from a roadside sensor for detecting an obstacle on the road, via a communication network, to a server communicating with the vehicle and the roadside device; and
    a controller, wherein
    the controller is configured to
    not transmit the detection information to the vehicle by the wireless communication in a case that the vehicle moving on the road toward the roadside device reaches a notification start point and that the vehicle is in a first geographic range, and
    transmit the detection information to the vehicle by the wireless communication in a case that the vehicle moves from the first geographic range to a second geographic range located closer to the roadside device than the first geographic range.

12. A server used in a traffic communication system, the server comprising:
    a communicator configured to communicate with a vehicle and a roadside device via a communication network, the communicator being configured to receive, from the roadside device, detection information indicating a detection result from a roadside sensor for detecting an obstacle on a road; and a controller configured to transmit the detection information received from the roadside device to the vehicle via the communication network in a case that the vehicle moving on the road toward the roadside device reaches a notification start point and that the vehicle is in a first geographic range, wherein the controller is configured to not transmit the detection information to the vehicle via the communication network in a case that the vehicle moves from the first geographic range to a second geographic range located closer to the roadside device than the first geographic range.

13. A traffic communication method comprising:

detecting, by a roadside sensor, an obstacle on a road;

transmitting, by a roadside device configured to perform wireless communication with a vehicle on the road, detection information indicating a detection result from the roadside sensor, via a communication network, to a server communicating with the vehicle and the roadside device;

transmitting, by the server, the detection information received from the roadside device to the vehicle via the communication network in a case that the vehicle moving on the road toward the roadside device reaches a notification start point and that the vehicle is in a first geographic range;

not transmitting, by the server, the detection information to the vehicle via the communication network in a case that the vehicle moves from the first geographic range to a second geographic range located closer to the roadside device than the first geographic range;

transmitting, by the roadside device, the detection information to the vehicle by the wireless communication in a case that the vehicle moves from the first geographic range to a second geographic range located closer to the roadside device than the first geographic range; and not transmitting, by the roadside device, the detection information to the vehicle by the wireless communication in a case that the vehicle moving on the road toward the roadside device reaches the notification start point and that the vehicle is in the first geographic range.

* * * * *